United States Patent [19]
Bodde

[11] 3,753,520
[45] Aug. 21, 1973

[54] TWO-POSITION SPARE TIRE MOUNTING ASSEMBLY

[76] Inventor: Egbert J. Bodde, Rt. 1, Trego, Wis.

[22] Filed: Sept. 30, 1971

[21] Appl. No.: 185,149

[52] U.S. Cl............ 224/42.06, 214/453, 224/42.21
[51] Int. Cl............................................ B62d 43/02
[58] Field of Search.................... 224/42.21, 42.12, 224/42.23, 42.28, 42.29, 42.06; 214/451, 453, 454, 452

[56] References Cited
UNITED STATES PATENTS

| | | | |
|---|---|---|---|
| 3,398,846 | 8/1968 | Ragan et al.......................... | 214/454 |
| 1,979,809 | 11/1934 | Newton......................... | 224/42.21 X |
| 3,648,867 | 3/1972 | Beavers............................. | 214/454 |
| 1,974,599 | 9/1934 | Bradford....................... | 224/42.21 X |

FOREIGN PATENTS OR APPLICATIONS

| | | | |
|---|---|---|---|
| 1,254,492 | 11/1967 | Germany............................ | 214/454 |

Primary Examiner—Gerald M. Forlenza
Assistant Examiner—Jerold M. Forsberg
Attorney—Everett J. Schroeder, Robert O. Vidas et al.

[57] ABSTRACT

A spare tire mounting assembly is provided which is especially adapted for use with motor vehicles such as station wagons having an openable rear portion. The assembly provides for alternate storage of the spare tire either on the external rear of the vehicle or along a longitudinal side thereof. Movement of the spare tire between the two points is provided by means of an elongated supporting member pivotally mounted to the vehicle at one end thereof and by pivotal mounting of the spare tire at the other end of the elongated supporting member.

12 Claims, 9 Drawing Figures

INVENTOR
EGBERT J. BODDE
BY
Schroeder, Siegfried, Ryan & Vidas
ATTORNEYS

INVENTOR
EGBERT J. BODDE
BY
Schroeder, Siegfried, Ryan & Vidas
ATTORNEYS

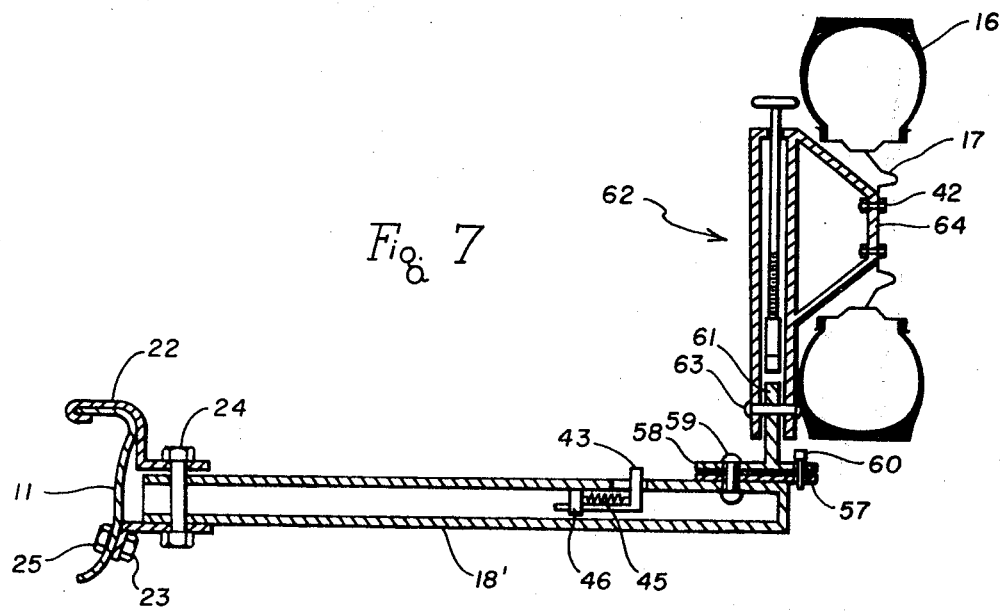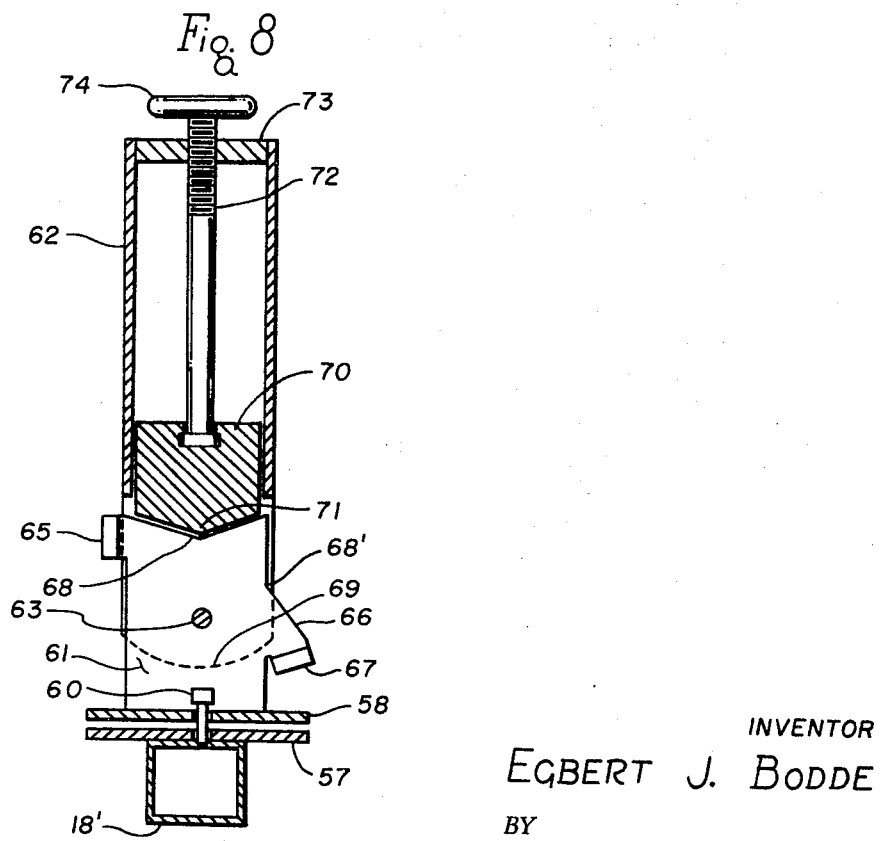

INVENTOR
EGBERT J. BODDE

TWO-POSITION SPARE TIRE MOUNTING ASSEMBLY

The present invention is directed to efficient storage of a spare tire for a motor vehicle on the exterior portions thereof. The invention provides a spare tire mount assembly which permits the user thereof to store his spare tire at either one of two positions on the vehicle thereby permitting ready access to the rear of the vehicle or to permit long objects to be carried in the vehicle that would project beyond the position normally occupied by the spare tire. The pivotal mounting also can be used merely to move the spare tire temporarily out of the way of the rear tailgate.

Although the quality of tires has markedly improved, it is still considered necessary that an automobile or truck be provided with a spare tire in the event that a flat occurs. While my invention will undoubtedly find use in several types of vehicles, it will be described with particularity on a vehicle of the station wagon type. In such vehicles it has been proposed in the past that an external mounting for the spare tire be used to save space on the inside of the vehicle for carrying of other objects including passengers. The most common recent location of such spare tire mounts has been upon the rear of the vehicle generally centered thereon for symmetrical appearance. However, in such a position the spare tire and mount interferes with ready access either to the trunk portion of a passenger vehicle or it interferes with the operation of the tailgate and rear window assembly of a station wagon. Through the use of my invention the spare tire may be mounted in this normally desirable position at the immediate center rear of the vehicle and yet can be readily stored without substantial effort from the operator in a second position along the side of the vehicle, thus providing ready access to the rear of the station wagon. This two-position capability of my invention is provided by having the spare tire assembly pivotally mounted to one end of an elongated supporting arm member which is mounted at the opposite extremity thereof by pivoting means to the body of the vehicle. Thus, without removal of the spare tire from the assembly the spare tire can be pivotally repositioned to either one of two positions, or, if desired, may merely be moved out of the way temporarily for purposes such as loading and unloading the rear portion of the station wagon.

IN THE DRAWINGS

FIG. 7 is a cross-sectional view of a second form of the invention;

FIG. 8 is an end elevational view partially in section of the spare tire mounting portion of FIG. 7 viewed from the right-hand end thereof.

It should be understood that in each of the several figures and descriptive matter that follows like parts will be given the same numerical designation.

Figure 1:
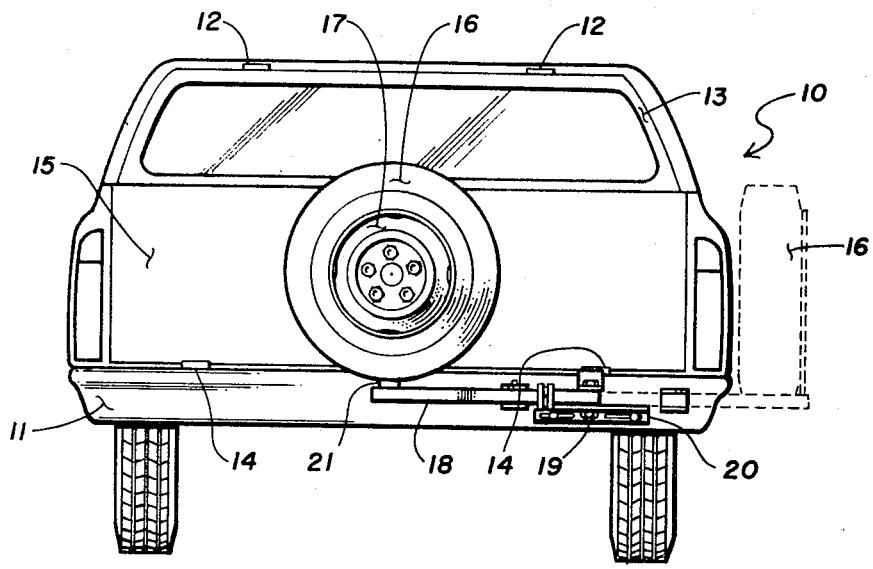
FIG. 1 is a rear elevational view of a station wagon showing a spare tire mounted on a mounting assembly in accordance with my invention and showing in dotted outline an alternative mounting position.

Referring first to FIG. 1, there is shown in rear elevational view a station wagon-like vehicle generally designated 10 of the type commonly sold for use by the general public as a combination pleasure and utility vehicle. Such a vehicle typically is provided with a rear bumper assembly 11. It also is provided with a rear window panel 13 which is pivotally supported by hinges 12 which permit a pivotal raising of the rear window. A tailgate assembly is provided by hinges 14 which permit the rear lower panel 15 to move down into a horizontal position to form an extended tailgate.

Centrally mounted at the rear portion of the vehicle is a spare tire 16 which is mounted upon a central wheel rim 17.

The spare tire and rim arrangement is in turn supported by an elongated arm 18 that is pivotally mounted at one end thereof by a pivot 19 to a bracket assembly generally designated 20 which is shown affixed to bumper 11. Of course, bracket assembly 20 can also be mounted to the chassis of the vehicle instead of being bumper mounted although bumper mounting will not require any significant modification of existing vehicles. At the opposite end of the arm 18 a spare tire mounting arm 21 is provided for attaching wheel rim 17 thereto. Only the lower portion of this assembly 21 is visible in FIG. 1.

Also illustrated in FIG. 1 by dotted outline is the alternate position for storage of the spare tire assembly. As can be seen arm 18 has been rotated about pivot 19 and tire 16 has been rotated upon arm 21 so that it is positioned as shown along the side of the vehicle and parallel to the length of the vehicle.

Figure 2:
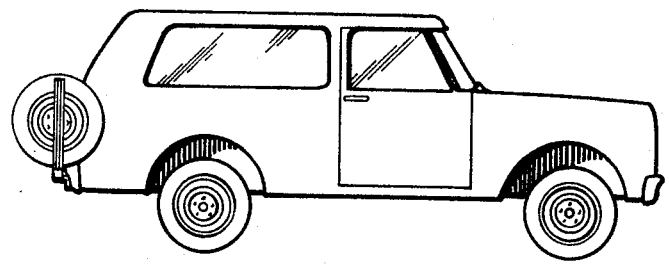
FIG. 2 is a side elevational view of the rear portion of the station wagon of FIG. 1 wherein the spare tire is positioned by the mounting assembly so that its plane is parallel to the side of the automobile.

Referring to FIG. 2, there is a side elevational view of the spare tire mounting assembly after it has been rotated about pivot 19 so as to position the spare tire parallel to the side of the vehicle. In this position the spare tire no longer interferes with operation of tailgate 15. Tailgate 15 may now be opened or even left in a downward position as if spare tire 16 were not externally stored.

Figure 3:
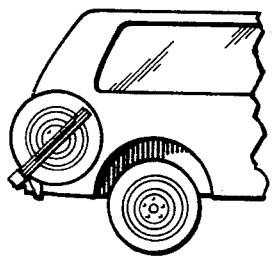
FIG. 3 is similar to FIG. 2 and shows the spare tire mounting assembly forwardly tilted to have less of the spare tire projecting beyond the rear of the vehicle.

In FIG. 3 is shown an alternate form of the invention wherein the tire assembly as illustrated in FIG. 2 has been provided with a pivot to provide a partial clockwise rotation of spare tire 16 about the longitudinal access of arm 18 thereby storing the tire further along the vehicle with less overhang of the tire beyond the rear end of the vehicle.

Figure 4:
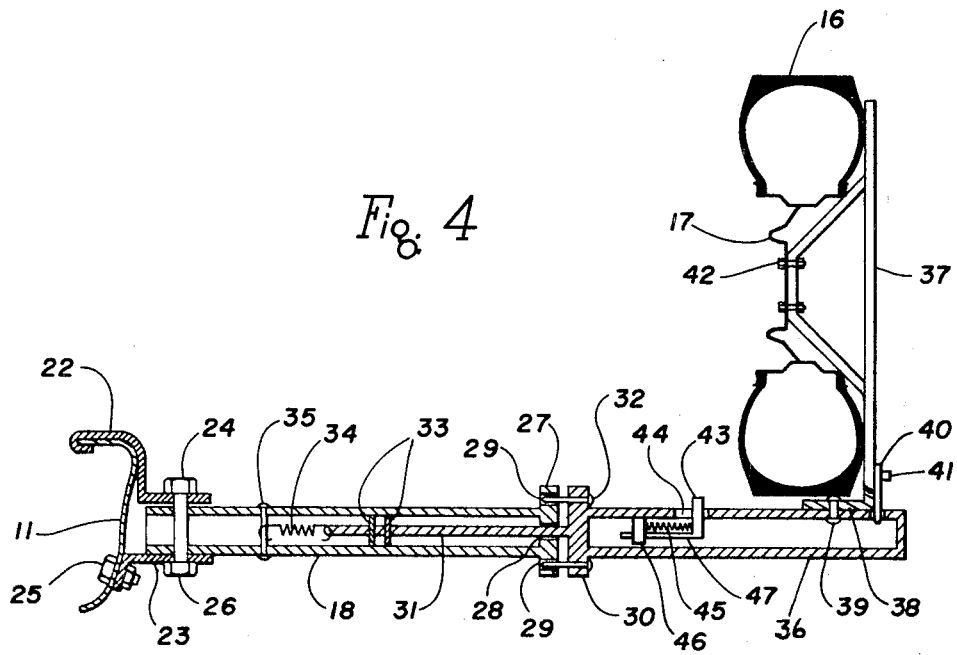
FIG. 4 is a cross-sectional view of the mounting assembly in accordance with the invention.
Figure 5:
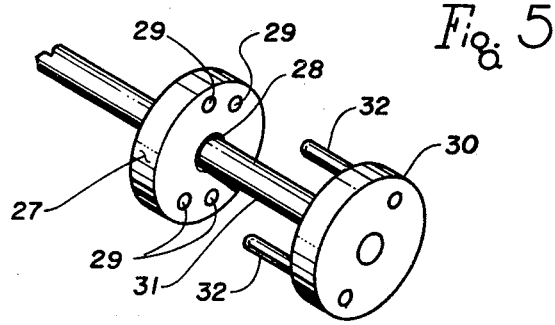
FIG. 5 is an exploded view of a two-position locking arrangement for use in the apparatus of FIG. 4.

Turning now to FIG. 4 there is illustrated in cross-sectional view and in detail apparatus in accordance with the invention for performing the various storage positions illustrated in FIGS. 1, 2 and 3. In the Figure a bumper 11 has had attached thereto an upper clamp element 22 and a lower clamp element 23 which are joined to one another by means of a large bolt 24 which extends through suitable holes in clamp elements 22 and 23. Clamp element 23 is joined to bumper 11 by means of a bolt 25 extending through the clamp element 23 and through bumper 11.

An elongated arm member 18 is mounted pivotally at one end thereof between clamp elements 22 and 23 by means of bolt 24 which passes through a hole in the end of arm 18 and is locked by connecting nut 26. Arm 18 is thus permitted to rotate in a plane perpendicularly to the plane of the paper about bolt 24.

Arm 18 is preferably formed of a tubular member having a circular cross-section throughout most of its length with the portion at the end pierced by bolt 24 being of a rectangular cross-section. At the opposite end of arm 18 to bolt assembly 24 there is provided a welded collar member 27 having an opening 28 passing through the center thereof and having indexing openings 29 around a radius thereof. Cooperatively engaging 27 is a second collar-like member 30 having an elongated shaft 31 welded to the axis and extending through opening 28 of collar 27. Member 30 also has mounted to and projecting from a surface thereof pin members 32 diametrically opposed along the axis of member 30 and positioned to cooperatively engage diametrically opposed holes 29 of element 27. Thus, when element 27 and element 30 are in juxtaposition pins 32 will be inserted in one of the sets of holes in member 27 locking shaft 31 and member 30 from rotation.

As can be best seen in FIG. 4, shaft 31 extends along the length of tube 18 and passes through a pair of aligning washer members 33 which are fixed in position relative to tube 18 by welding or the like. The function of washers 33 and of the opening 28 and collar 27 is to permit member 31 to slidably move along the length of rod 18 and yet be relatively free from transverse motion. By means of a spring 34 attached to the end of rod 31, rod 31 and its supporting member 30 and biased toward the bumper assembly, although spring 34 can be overcome by pulling away from the bumper assembly thereby permitting rod 31 and its attendant connecting member 30 to rotate about an axis perpendicular to that of the longitudinal direction of tube 18. The extent of travel of rod 31 is limited by spring 34 and can be further limited by suitable stop means such as by threading the spring end of rod 18 and use of a nut thereon. The opposite end of spring 34 can be suitably mounted to tube 18 by means of a pin 35.

Fixedly mounted to the outer side of collar 30 as by welding is an extension of tube member 18 which is designated 36. Extending vertically upwardly from member 36 is a spare tire mounting bracket 37 which is mounted by means of bolts 42 to the tire rim 17. Member 37 has an L-shaped flange 38 which has a pin 39 passing therethrough and into tube 36. This pin permits rotational movement of member 37 about pin 39 so as to change the axis of the tire mount 37 through a 90° motion. Means such as pin 40 are provided for locking member 37 at either end of its 90° rotation. Member 40 can desirably be constructed of a pin member having an extension 41 for aid in manipulating the pin in a vertical motion. A spring means (not shown) can be utilized to bias pin 40 downwardly into member 36. Suitable holes are provided in member 36 for latching assembly 37 by means of pin 40 in each of the two positions.

Also illustrated in FIG. 4 is a latch pin member 43 having a lower portion 47 at a right angle thereto passing through an opening in a guide member 46. Latch pin 43 is positioned within an elongated slot 44 having its longitudinal axis extending along the length of member 36. A spring 45 biases latch pin 43 toward the bumper assembly. The purpose of latch pin 43 will be best understood in reference to FIG. 6.

Figure 6:
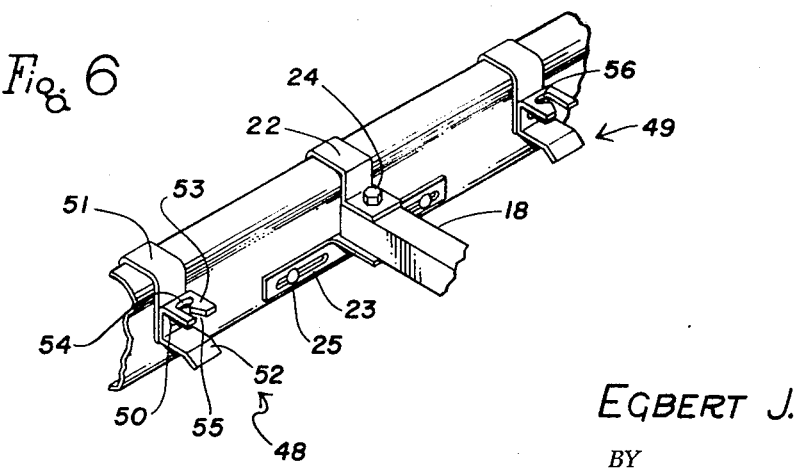
FIG. 6 is a perspective view of a rear bumper assembly showing the means for locking the arm assembly of the apparatus of FIG. 4 in either one of the two positions.

In FIG. 6 there is illustrated the bumper mounting assembly as illustrated in FIG. 4 and further illustrates two arm support and lock arrangements generally designated 48 and 49 respectively. Arm aupport and lock 48 and 49 are similar in construction with the exception of an engaging slot member. Member 48 consists of a bracket having a U-shaped cross-section that is mounted by means of a bolt 50 and a curved upper portion 51 to the bumper assembly. The lower portion of the member 48 consists of a flat plane 52 having the forward edge thereof generally tipping in a downwardly direction as shown. This lower edge 52 is designed to act as a rest and support for arm 36 when arm 18 is pivoted about pin 24 into the position shown in FIG. 1 with the tire in the center of the rear of the vehicle. As a means of maintaining the arm in supportive relationship to bracket 48 there is an upper outwardly projecting flange 53 having a slot 54 of a configuration as shown. The entire assembly 48 is positioned so that the slot 54 is able to receive latch pin 43 when arm 18 is pivoted so as to engage member 36 with surface 52. The initial angle of slot 54 forces latch pin 43 out against spring 45 until arm 36 is tightly pressed up against assembly 48. Latch pin 43 is then free under the bias provided by spring 47 to slip into the rear portion of slot 54. In this position the entire assembly cannot pivot about pin 24 as it is restrained by the lip portion 55. To release the arm from this position the operator merely presses against latch pin 43 so as to move it against the bias of spring 47 out into a region where the arm can be pivoted free from this latch.

Member 49 functions as element 48 with the exception that slot 56 has been shaped so as to provide the latching arrangement as does slot 54. The two slots are essentially mirror images of one another.

Other means can be provided for fixedly positioning arm 18 at each end of its pivotal motion. For example, a simple pin and hole arrangement at the region of pivot pin 24 can be used. Holes through member 24 and arm 18 in alignment at the extreme ends of rotation can be used in conjunction with a pin to fixedly position arm 18.

The operation of the invention should now be apparent. If the tire is in its normal riding position as shown in the solid outline of FIG. 1 and the operator of the vehicle desires to move the tire out of its stored position, he merely presses against latch pin 43 so as to allow latch pin 43 to be disengaged from slot 54. By pulling outwardly arm 18 pivots about pin 24 to move the tire away from the rear of the vehicle. The tailgate can now be opened if desired. If it is desired to leave the tailgate down or readily accessible the operator proceeds as follows. Once the tire is removed away from the rear of the vehicle the operator can then raise pin 40 by means of extension 41 to permit the spare tire to be rotated about a 90° turn. Then arm 18 can be continued in its rotation until it has traversed 180° and the tire is in position along side the vehicle as shown in dotted outline in FIG. 1 and as illustrated in FIG. 2. At this position latch pin 43 is engaged by assembly 49. To store the tire in the forwardly tilted position of FIG. 3, the operator merely pulls outwardly upon assembly 37 so as to disengage pins 32 of plate 30 from openings 29 of plate 27. Then the entire end assembly 36 can be rotated along with rod 31 to the second position of the tilt shown in FIG. 3. The operator then merely releases his outward pressure on assembly 37 allowing pins 32 to engage with the second set of openings 29 and plate 27 is thus prevented from further rotation. Of course, bracket 49 can be used to support the outer end of the arm assembly 36 either before or after rotation of the tire and bracket 37 to the position shown in FIG. 3.

Turning now to FIG. 7 there is illustrated in cross-sectional view and in detail a modified form of the invention which possesses certain advantages of simpler construction over the form previously described. In the Figure parts which are substantially identical to those of the earlier Figures have been given the same numerical designation. An elongated arm 18' which is preferably formed of a rectangular cross-section hollow tube is pivotally mounted by means of holes therethrough and pin 24 to the bumper bracket assembly as in the case of the description of FIG. 4. At the opposite end of arm 18' is a plate member 57 which has been attached as by welding to arm 18'. Above plate 57 is a substantially matching plate 58 which is held in pivotal engagement to plate 58 by pin 59. Thus plate 58 may pivot about an axis perpendicular to that of arm 18'. Suitable holes and a pin 60 is provided for locking plates 57 and 58 in relative rotational position to one another as desired.

Figure 9:
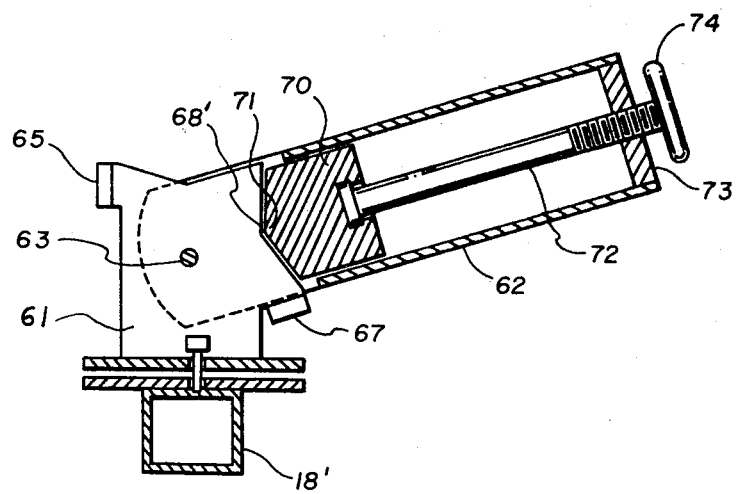
FIG. 9 is an end elevational view partially in section of the assembly of FIG. 8 with the vertical arm portion pivoted to a position for storage as in FIG. 3.

Extending upwardly from and connected to plate 58 is a vertical post member 61 which is shaped in the manner best seen in FIGS. 8 and 9. A tubular member generally identified 62 has had the lower central portion thereof removed to produce a fork. Assembly 62 is pivotally joined by pin 63 extending through the tines of the fork portion thereof and through vertical post 61. An adapter 64 with suitable holes for bolting on a spare tire is mounted to element 62.

Arm 18' is provided with a latch pin 43 and assembly which are substantially the same as that described with respect to FIG. 4.

Turning to FIG. 8 there is illustrated in partially cross-sectional view the assembly of FIG. 8 viewed from the right side of the Figure. In this Figure the spare tire and its mount 64 are not shown in detail for sake of clarity. It can be seen that upright post member 61 has a stop member 65 which has been attached to member 61 as by welding. This stop member can be a simple block of metal which extends outwardly from one or both sides of member 61 so as to block pivotal motion of the fork in the counterclockwise direction from the position shown. Post member 61 also has an extension to the right-hand side thereof identified 66 whose function will be explained. At the lower portion of extension 66 is a second stop member 67 which acts to prevent rotation of the fork in a clockwise direction in a manner analogous to stop 65. As can be seen from the Figure the upper portion of post 61 has been provided with a V-shaped trough 68 whose function will now be described.

Upper member 62 is mounted via pin 63 to post member 61 for pivotal movement thereabouts. The forked portion of member 62 is indicated by dotted outline 69.

Desirably member 62 is formed of a square or rectangularly shaped tube member. Slidably positioned within the interior of member 62 is a wedge 70 having a forward portion 71 which is shaped to conform to V-shaped trough 68. Wedge 70 is mounted to a threaded rod 72 which passes through a threaded hole in plate 73. That is fixed relative to tubing 62 by appropriate means such as welding. At the upper end of rod 72 there is provided a knurled handle 74 which can be used to advance or retract wedge 70 to and from its locking engagement with V-shaped groove 68.

It should now be apparent that member 62 is not free to pivot in relation to post 61 as long as wedge member 70 is pressed into engagement with V-shaped notch 68. However, when wedge 70 is raised above groove 68 the assembly including the spare tire can pivot in a clockwise direction about pivot 63. It is restrained from pivoting in a counterclockwise direction, as already noted, by stop member 65.

Turning to FIG. 9 the assembly is shown with member 62 pivoted about pin 63 to a second stop position determined by stop 67. Wedge 70 has been once again advanced to lock into engagement with the shoulder 68 attached to post 61 thereby locking the assmbly in the position shown. In this position shown in FIG. 9 the spare tire is in appropriate position for storage along the side of the vehicle as illustrated in FIG. 3.

The operation of the assembly in accordance with FIGS. 7, 8 and 9 should now be apparent. One can pivot arm 18' so that it can be in the position shown by the solid outline of FIG. 1 or in the dotted outline of FIG. 1. The entire mounting assembly for the spare tire including the vertical post member can be rotated in either a clockwise or a counterclockwise direction about an axis vertical to that of arm 18'. Once the desired position is achieved the plate member 58 is locked in relationship to plate 57 by means of pin 60 passing through holes in each of these plates. By backing off wedge 70 from V-shaped trough 68 or 68' the upper portion of the spare tire mounting assembly 62 can be pivoted to either the position illustrated in FIG. 2 or in FIG. 3.

Various modifications of my invention will now be readily apparent. When desired, suitable electric harnessing arrangements can be utilized to provide a light in the midst of the spare tire mounting assembly. This will be advantageous when the spare tire is in position along the side of the vehicle as shown in FIG. 2 to provide taillight illumination of the side of the vehicle.

Likewise, any of a variety of prior art locking arrangements can be used to prevent theft of the externally positioned spare tire.

I claim:

1. A road vehicle mountable, two-position spare tire mounting assembly comprising:
   a. an elongated supporting member having a first and a second end portion;
   b. vehicle mounting means adapted to be fixedly joined to an end portion of said vehicle;
   c. first pivot means joining said first end portion of said supporting member to said vehicle mounting means to provide about 180° pivotal movement of said supporting member about a generally vertical axis;
   d. a spare tire mounting bracket;
   e. second pivot means joining said second end portion of said supporting means to said spare tire mounting bracket to provide pivotal movement of about 90° with respect to said elongated supporting member for said spare tire mounting bracket about a generally vertical axis; said bracket being joined to said supporting member so that when said assembly is mounted to a vehicle a spare tire mounted to said bracket will be in substantially vertical orientation; and f. latching means for releasably supporting said elongated supporting member at each of the extreme ends of its pivotal motion to thereby store a spare tire mounted thereto in position along the side of a vehicle or parallel to an end of a vehicle.

2. An assembly in accordance with claim 1 wherein said vehicle mounting means is constructed and arranged to be mounted to a vehicle bumper.

3. An assembly in accordance with claim 1 wherein the latching means for releasably positioning said elongated arm are U-shaped support means constructed and arranged to be mounted to a vehicle in the plane of rotation of said supporting arm and on opposite sides of said first pivot means.

4. An assembly in accordance with claim 1 wherein said elongated arm includes first and second sections, the first of said sections being joined to said first pivot means and the second section being joined to said second pivot means and pivotably joined to said first section so that said second section is partially rotatable about the longitudinal axis thereof relative to said first section.

5. An assembly in accordance with claim 4 wherein the first and second sections are telescopically joined and wherein stop means are provided to hold the second section at predetermined points of its rotation relative to said first section.

6. In combination with a wheeled vehicle having an openable rear panel section and a rear bumper assembly, an elongated supporting member having a first and second end portion, mounting means fixedly joined to the rear of said vehicle at a point intermediate the sides and center axis thereof, first pivot means joining said first end portion of said supporting member to said mounting means to provide pivotal movement of about 180° for said supporting member about a generally vertical axis, a spare tire mounting bracket, second pivot means joining said second end portion of said supporting means to said spare tire mounting bracket to hold said bracket so that a spare tire mounted thereto will have a generally vertical orientation and to provide pivotal movement of about 90° with respect to said elongated supporting member for said bracket about a generally vertical axis, and latching means for releasably positioning said supporting member at the extreme ends of its pivotal motion to thereby store a spare tire in position along the side of said vehicle or parallel to the end of said vehicle.

7. A combination in accordance with claim 6 wherein the mounting means is joined to the rear bumper assembly.

8. A combination in accordance with claim 7 wherein second and third support means for the second end portions of said support members are mounted to said bumper on opposite sides of said mounting means and in the plane of pivotal movement of said supporting member, said second and third support means each including a flange projecting towards the rear of said bumper, said flange adapted to receive and support said supporting member.

9. A combination in accordance with claim 6 wherein said elongated arm includes first and second sections, the first of said sections being joined to said first pivot means and the second section being joined to said second pivot means, and pivotably joined to said first section so that said second section is partially rotatable about the longitudinal axis thereof relative to said first section.

10. A combination in accordance with claim 9 wherein the first and second sections are telescopically joined and wherein stop means are provided to hold the second sections at predetermined points of its rotation relative to said first section.

11. A road vehicle mountable, two-position spare tire mounting assembly comprising:

a. an elongated supporting member having a first and a second end portion;

b. vehicle mounting means adapted to be fixedly joined to an end portion of said vehicle;

c. first pivot means joining said first end portion of said supporting member to said vehicle mounting means, to provide about 180° pivotal movement of said supporting member about a generally vertical axis;

d. a spare tire mounting bracket;

e. second and third pivot means intermediate of and joining said second end portion and said spare tire mounting bracket, said bracket being joined to said supporting member so that when said assembly is mounted to a vehicle a spare tire mounted to said bracket will be in substantially vertical orientation, said second pivot means providing pivotal movement of about 90° with respect to said elongated supporting members for said spare tire mounting bracket about a generally vertical axis and said third pivot means providing limited pivotal movement of the tire mounting bracket about an axis generally perpendicular to said vertical axis; and, f. means for releasably positioning said elongated supporting member at each of the extreme ends of its pivotal motion to thereby store a spare tire mounted thereto in position along the side of a vehicle or parallel to an end of a vehicle.

12. An assembly in accordance with claim 11 wherein said third pivot means includes a post member projecting rigidly and vertically upward from said second end portion of said elongated supporting member and a tubular member whose upper portion supports said tire mounting bracket and whose lower end region is a fork whose tines are on opposite sides of said post member and joined thereto by a pin extending through said post and said tines thereby providing pivotal movement of said tubular member.

* * * * *